United States Patent

Behr

[15] 3,646,535

[45] Feb. 29, 1972

[54] METHOD AND APPARATUS FOR MEASURING TAPE SPEED

[72] Inventor: Michael I. Behr, South Pasadena, Calif.

[73] Assignee: Burroughs Corporation, Detroit, Mich.

[22] Filed: Nov. 18, 1969

[21] Appl. No.: 877,698

[52] U.S. Cl. ................................340/174.1 B, 340/174.1 A

[51] Int. Cl. ..........................................................G11b 5/00

[58] Field of Search ..............340/174.1 P, 174.1 A, 174.1 H, 340/174.1 B; 179/100.2 B; 324/181

[56] References Cited

UNITED STATES PATENTS

| | | | |
|---|---|---|---|
| 2,789,026 | 4/1957 | Nordyhe | 340/174.1 B |
| 2,961,642 | 11/1960 | Lamo | 340/174.1 I |
| 3,056,950 | 10/1962 | Birmingham | 340/174.1 B |
| 3,107,347 | 10/1963 | Huss | 340/174.1 I |
| 3,187,111 | 6/1965 | Smaller | 179/100.2 B |
| 3,243,789 | 3/1966 | Ragle, Jr. | 340/174.1 B |
| 3,402,402 | 9/1960 | Dorrell | 340/174.1 H |
| 3,503,059 | 3/1970 | Ambrico | 340/174.1 A |

*Primary Examiner*—Daryl W. Cook
*Assistant Examiner*—Jeremiah Glassman
*Attorney*—Christie, Parker & Hale

[57] ABSTRACT

A monitor for sensing the instantaneous speed of a magnetic medium utilizing a single magnetic head having a first leg coupled to a signal generator and a second leg to a pulse peak detector for recording and detecting a timing signal as an incremental portion of the magnetic recording medium traverses the nonmagnetic gap defined by the head. The head is incorporated in a magnetic recording apparatus as a permanent part of the apparatus or in a portable probe. An output from the peak detector energizes the signal generator such that the frequency of the detected signals is a function of the instantaneous speed of the recording medium.

20 Claims, 3 Drawing Figures

INVENTOR.
MICHAEL I. BEHR

BY

Christie, Parker & Hale
ATTORNEYS

METHOD AND APPARATUS FOR MEASURING TAPE SPEED

DESCRIPTION OF THE PRIOR ART

The present invention relates to magnetic recording and reproducing apparatus and in particular to a method and an apparatus for measuring the instantaneous speed of a magnetic medium used in conjunction with the recording and reproducing apparatus.

The measurement of tape speed in presently available transports normally involves the use of prerecorded timing bits on tape in conjunction with conventional reproduce heads or the provision of a special type of magnetic head, e.g., a head incorporating two or more magnetic gaps within the single head structure. In the first approach the prerecording of timing data requires either the provision of a separate channel on the recording medium or, where the timing data is erased, limits the use of the medium to a single pass. While being useful for the measurement of instantaneous tape speed, such an approach is generally applicable for determining instantaneous speed during reading only. Although removal of the timing information and subsequent utilization of the channel is possible, such an approach, of necessity, involves time and expense in the prerecording of the timing data prior to reuse of the tape and the provision of additional magnetic transducers for the purpose of erasing the timing data.

In the second approach referred to above a special head is provided having dual magnetic gaps with the first of the two gaps being employed to record and the second gap to detect the timing information. A signal is thereby derived which is a function of the average speed of the medium past the dual gap head. Such a system is described in U.S. Patent No. 3,439,354. The spacing between the gaps, however, imposes a delay interval between the time of recording and detecting the timing information and prevents instantaneous or near instantaneous measurement of tape speed. Although the arrangement disclosed in U.S. Pat. No. 3,439,354 is a significant stride forward in the art, an anomaly in the motion of the magnetic recording medium relative to the magnetic head occuring in the delay interval between recording and detection of the timing data may not be detected with the consequent creation of undesired errors. As information packing densities on magnetic media are increased, the need for measuring instantaneous speed changes becomes increasingly important.

SUMMARY OF THE INVENTION

The present invention eliminates the need for the prerecording of timing data and/or a separate recording channel and provides a means of measuring the instantaneous speed of a magnetic medium as information is being recorded on the medium. According to the invention an arrangement is provided in which a single magnetic transducer utilizing a single nonmagnetic recording gap, together with additional circuitry operatively coupled to the transducer, reads and thereafter writes responsive to reading, timing data as an incremental unit of the magnetic medium moves past the gap in the magnetic head.

The present invention provides an apparatus for measuring the speed of a magnetic medium which comprises a magnetic head having a pair of legs defining a nonmagnetic gap, a write winding operatively coupled to a first one of said legs and a read winding operatively coupled to the second of said legs. Circuit means interconnect the read winding and the write winding for detecting a magnetic transition as the medium is moved relative to the nonmagnetic gap and for recording a magnetic transition on the medium responsive to the detection of a magnetic transition by the read winding. A signal from the interconnecting circuit means can then be monitored and transmitted to a display apparatus for providing an indication of the instantaneous speed of the magnetic medium.

The invention further contemplates a method of measuring the speed of a magnetic medium with a magnetic transducer having a single nonmagnetic gap comprising the steps of applying a pulse of short duration to the magnetic transducer to produce a magnetic transition on the medium and moving the magnetic medium across the gap defined by the head. The magnetic transition is detected by the same transducer as it moves through a predetermined position relative to the gap with the time elapsed between the production and the subsequent detection of the magnetic transition being related. The elapsed time measurement is then converted into an indication of the speed of the medium.

As provided by the present invention the apparatus is readily adaptable for incorporation in a magnetic recording apparatus as a fixed feature of a tape drive and likewise is equally adaptable for use as a portable probe with tapes or discs. Additional embodiments contemplated include making the speed sensing head a part of one of the guiding posts of the recording apparatus and locating the head so as to read the recorded timing signals through the tape backing. Such a location of the head is possible because sufficiently long signal wavelengths are involved which are not significantly affected or attenuated by the head to medium spacing. In all of the embodiments, there is thus provided a means for monitoring instantaneous tape speed during all phases of transport operation, particularly the writing or recording phase.

BRIEF DESCRIPTION OF THE DRAWING

The foregoing will be better understood by reference to the following figures in which.

DESCRIPTION OF A SPECIFIC EMBODIMENT

Figure 1:
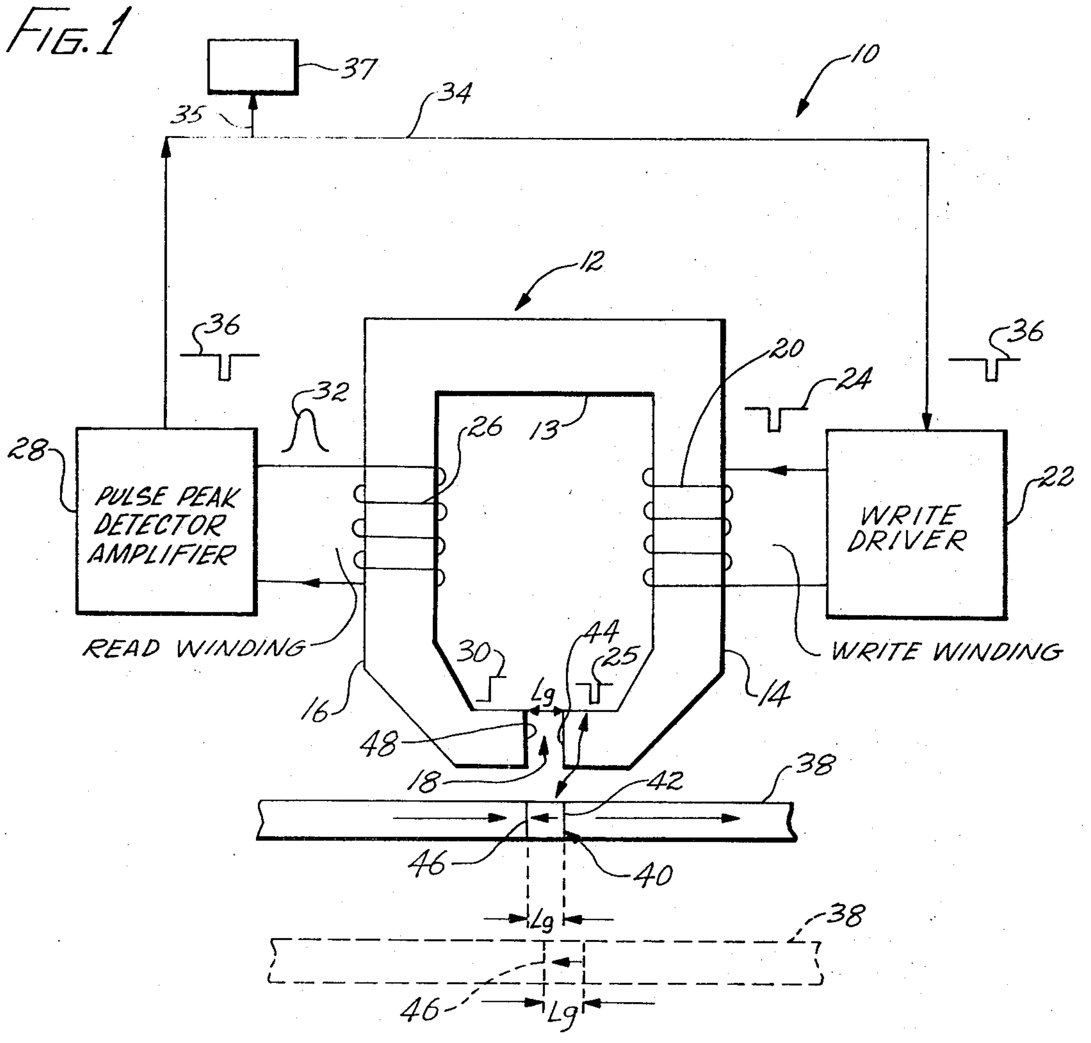
FIG. 1 is a schematic diagram of a tape speed monitor according to the present invention.

A schematic diagram of a monitor 10 according to the present invention is shown in FIG. 1. The monitor includes a magnetic transducer 12 having a core portion 13 from opposite sides of which extend a write leg 14 and a read leg 16 which together define a nonmagnetic gap 18 at the point of closest approach between legs 14 and 16. A portion of a magnetic medium 38 is illustrated as it is being passed in a recording relation past gap 18. A write winding 20 is wound about leg 14 in an operative magnetic recording relationship with the transducer. The output side of a write-driver signal generator 22 is connected to winding 20 for generating a timing pulse 24 which is of a short duration relative to the time required to move a magnetic medium across a distance $L_g$ (the length of gap 18). The term $L_g$ can be determined by measuring the dimension indicated in FIG. 1. Pulse 24 generates a signal 25 which is recorded on the magnetic medium as a magnetic transition 40.

The accuracy of the instantaneous speed measurement obtainable by the present invention is related to the duration of the recorded pulse. As the pulse duration increases, the accuracy of the speed measurement is diminished. Given the parameters of gap length, speed of the magnetic medium, the amount of delay introduced by the circuitry between the read and write windings and pulse duration for a particular embodiment, the accuracy of the measurement can be calculated.

A read winding 26 is wound about read leg 16 in an operative reading relationship with the transducer. Winding 26 is connected to the input of a pulse peak detector-amplifier 28. A signal 30 generated at gap 18 produces a pulse 32 in coil 26 which is transmitted to peak detector 28. At its output side, the detector-amplifier 28 is connected via electrical circuit connection 34 to the input side of signal generator 22, causing the generator to produce a timing pulse 24 responsive each time to the peak of a pulse 32 being detected by the peak detector and amplified to generate an output signal 36.

An output connection 35 to an oscilloscope or other frequency or time measuring and readout device 37 from interconnection 34 is provided for transmitting timing signals to a display device. The display device determines the frequency of the timing pulses (the reciprocal of the time elapsed between pulses) and, by suitable conversion of the frequency determination, the speed of the magnetic medium is determined.

Figure 2:
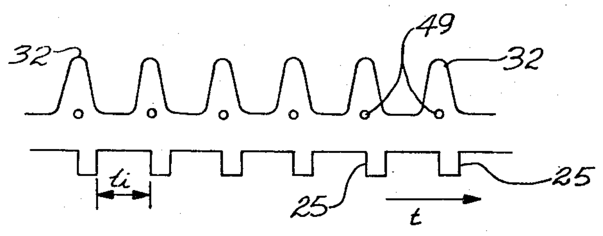
FIG. 2 is a series of representations of the signals recorded and detected in the course of utilizing the tape speed monitor of the present invention.

The operation of the tape speed monitor of the present invention will be described in conjunction with the remaining portion of FIG. 1 and the waveform diagram shown in FIG. 2. A magnetic medium 38 such as a tape having a magnetic film imposed on one side thereof is moved relative to gap 18 in its path of motion from a supply reel to a takeup reel (not shown). As generator 22 produces an output pulse, (a start pulse is either prerecorded or the generator is caused to produce such a pulse at the beginning of monitor operation) a magnetic transition 40 (dipole) is created on the magnetic tape. Transition 40 has a width $L_g$ proportioned to the length of gap 18, and at the instant of recording, the leading edge 42 of the transition is directly opposite the edge 44 of gap 18. Similarly, the trailing edge 46 of transition 40 is directly opposite the edge 48 of gap 18.

As magnetic tape 38 continues to move, the trailing edge 46 of the transition approaches edge 44 of gap 18. As trailing edge 46 passes through the center of gap 18, as shown in the ghosted portion of FIG. 1, a signal 30 is generated in read leg 16 and subsequently in read winding 26. The detection of a pulse on the read side of the transducer causes the generation of a pulse 36 at the output of detector-amplifier 28 which is transmitted to and triggers generator 22 to record the next succeeding magnetic transition on the recording medium. This circuit action continues with a string of timing signals being detected and thereafter recorded which are directly related to the instantaneous speed of the magnetic medium relative to the transducer gap. The monitor of the present invention has a further advantage that it is self-erasing. Thus the transitions are removed as detected leaving nothing on the tape. The waveform diagram of FIG. 2 illustrates a series of detected pulses 32 and the timing signals 25 which are generated responsive thereto. As described above, the passage of the trailing edge 46 of a recorded transition 40 past the center of the transducer gap produces a signal 30 in the read portion of the transducer and pulse 32 in winding 26. Disregarding circuit delay, the peak 49 of pulse 32 is sensed by detector 28 and in turn its output immediately causes generator 22 to produce timing signal 25 which produces the next succeeding transition on the medium. When this transition has moved a distance $L_g/2$, the next succeeding signal 30 is produced and the monitor action is repeated.

In determining the instantaneous speed of medium 38 with respect to the monitor of the present invention, it can be seen that as magnetic transition 40 moves halfway through gap 18, the trailing edge 46 of the transition has moved a distance $L_g/2$. By measuring the elapsed time between pulses 36 (or equivalently the time between pulses 25), the instantaneous velocity of the magnetic medium can be determined by relating the distance, rate, and time. In mathematical terms the relationship can be expressed as $v_i = L_g/2\, t_i$, where the term $v_i$ is the instantaneous speed of the magnetic medium and the term $t_i$ is the elapsed time for the magnetic transition to move halfway through the gap and can be measured as the time interval between pulses 36. The waveform diagram of FIG. 2, and specifically the time interval between pulses 25, is an accurate measure of the parameter $t_i$.

Figure 3:
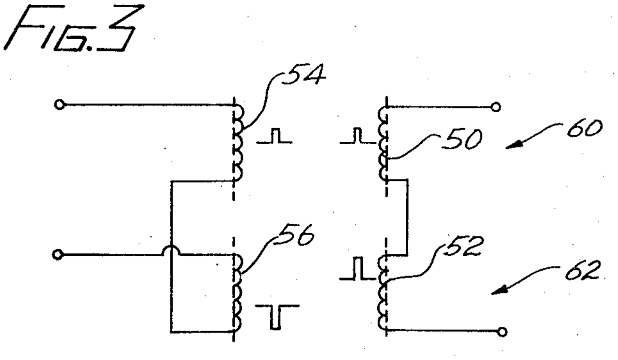
FIG. 3 is a partial schematic diagram of an alternate embodiment of the monitor of FIG. 1.

To reduce the effect of noise signals induced into the read winding by a record pulse 24, the circuitry of FIG. 3 is employed. A first magnetic transducer 60 is provided having a write winding 50 wound about one leg with the transducer being disposed in a recording relationship with the magnetic medium. A second dummy transducer 62 with characteristics identical to transducer 60 is also provided and is disposed at some convenient location in the monitoring equipment removed from a recording relationship with the magnetic medium. A write winding 52 is wound about one leg of transducer 62 in the same manner as winding 50 such that the two windings are identically poled and winding 52 is connected in series aiding circuit relationship with winding 50 as shown. Read windings 54 and 56 are wound on the opposite legs of transducers 60 and 62, respectively, such that these two windings are also identically poled and in contrast to the write windings, are connected in a series opposing circuit relation, as shown.

In operation with the configuration of FIG. 3 a pulse is transmitted to windings 50, 52 and a timing magnetic transition is recorded on the magnetic medium by write winding 50 for subsequent detection by read winding 54 as the medium moves across the transducer gap. At the instant of recording a noise signal is induced in each read winding 54, 56 by the two write windings 50 and 52. By virtue of the series opposing circuit relationship of the read windings the polarity of the noise signal induced in winding 54 is opposite to the polarity of the signal induced in winding 56 as illustrated by the signal indications located adjacent each winding in FIG. 3 and thus the two noise signals cancel each other. Since only windings 50 and 54 are in operative recording relationship relative to the magnetic medium, the timing signal is recorded and detected by the respective windings without cancellation or other impairment and the operation of the monitor continues as described above. The location of windings 52 and 56 at a position remote from the magnetic medium prevents the timing pulses transmitted to winding 52 from being recorded as well as preventing any stray signal which might be recorded on the medium to thereafter be picked up by winding 56 to cause the detected timing pulse in winding 54 to be cancelled. If necessary, equalizing networks are provided to compensate for mismatching between the characteristics of transducers 60 and 62.

A reduction of the noise signal in the read winding of the tape speed monitor of the present invention can also be accomplished by connecting the read and write windings of each transducer in a series aiding circuit relationship and arranging the winding of either the write or read windings such that they are opposite. The result is an arrangement in which one set of connected windings are poled identically and one set are poled oppositely. In general, with one of the four windings electrically or magnetically inverted relative to the remaining windings, reduction or elimination of the induced noise signal is accomplished.

Several applications for the monitor of the present invention include incorporation into a permanent part of tape drive apparatus or into a portable probe which can be temporarily positioned adjacent a medium whose speed is to be monitored and then removed for utilization on another transport apparatus. In the former application the transducer can be conveniently built into a guiding post of a tape transport in such a position that the timing signals are actually recorded and read through the tape backing. Such a configuration is possible because of the relatively long signal wavelengths involved, such wavelengths not being significantly attenuated by the head to medium spacing.

In summary, the present invention provides a monitor of the instantaneous speed of a magnetic medium such as a magnetic recording tape. The monitor includes a magnetic transducer having a core with two sides defining a gap across which the tape is passed. A winding is coupled to each leg with a signal generator coupled to one winding and a pulse peak detector and amplifier coupled to the other winding. The output of the detector-amplifier is fed to the input of the signal generator so that a magnetic transition is recorded on the tape by the generator. Subsequent detection of the transition causes the detector-amplifier to apply a succeeding pulse to the input of the generator, which in turn produces a new transition on the tape. The pulses from the sense amplifier provide an indication of the instantaneous speed of the tape. In one embodiment of the present invention it is contemplated that the circuitry of the pulse peak detecting and amplifying apparatus can be combined with the signal generator in a single module.

Both unmagnetized and premagnetized magnetic media are utilizable with the monitor of the present invention. A premagnetized medium is preferred with the further requirement in this preferred embodiment that the magnetic transition created on the medium of the monitor have an opposite polarity to that imposed on the medium by premagnitization. This embodiment has the advantage of producing a timing signal of significantly increased strength compared to that provided when the invention is utilized with an unmagnetized medium.

What is claimed is:

1. Apparatus for measuring the speed of a magnetic medium comprising:
- a magnetic head having a pair of legs defining a nonmagnetic gap;
- a write winding operatively coupled to a first one of said legs;
- a read winding operatively coupled to the second of said legs; and
- circuit means interconnecting the read winding and the write winding for detecting a magnetic transition as the magnetic medium is moved relative to the nonmagnetic gap and for recording a magnetic transition on the medium responsive to the detection of a magnetic transition by the read winding.

2. Apparatus according to claim 1 including means for locating the nonmagnetic gap in a magnetic recording position relative to the medium whereby timing signals may be recorded and detected as the medium is moved relative to the gap.

3. Apparatus according to claim 2 including a display device connected to the circuit means for providing an indication of the speed of the magnetic medium.

4. Apparatus according to claim 2 wherein said circuit means includes
- first means connected to the write winding for recording a magnetic transition on the medium;
- second means connected to the read winding for detecting the magnetic transition as the medium is moved relative to the gap, an input to said first means being coupled to an output of said second means whereby said first means is energized responsive to an output from said second means.

5. Apparatus according to claim 4 wherein the first means is a signal generator for generating a pulse of a duration which is short relative to the time for the magnetic medium to move a predetermined distance equal to the width of the nonmagnetic gap.

6. Apparatus according to claim 5 wherein the second means is a pulse peak detector and amplifier for detecting the passage of the magnetic transition through the center of the nonmagnetic gap and transmitting an energizing signal to the signal generator responsive to said detection.

7. Apparatus according to claim 2 including a pair of magnetic transducers, each transducer having a write winding and a read winding, respectively, one of said transducers being positioned in a recording relationship with the magnetic recording medium and the second transducer being positioned in a nonrecording relationship relative to the medium, the two write windings being electrically connected and the two read windings being electrically connected, said pair of interconnected write windings and read windings being wound in the same direction, respectively, one of said pair of interconnected windings being connected in series aiding relationship and the second of said pair of interconnected windings being connected in a series opposing circuit relationship.

8. Apparatus according to claim 2 including a pair of magnetic transducers, each transducer having a write winding and a read winding, respectively, one of said transducers being positioned in a recording relationship with the magnetic recording medium and the second transducer being positioned in a nonrecording relationship relative to the medium, the two write windings being electrically connected and the two read windings being electrically connected, the pair of interconnected write windings and read windings being connected in a series aiding circuit relationship, respectively, one winding of one of said pair of interconnected windings being wound in the opposite direction to that of its interconnected winding, the remaining pair of said interconnected windings being wound in the same direction.

9. The method of measuring the speed of a magnetic recording medium with a magnetic transducer having a single nonmagnetic gap comprising the steps of:
1. applying a pulse of short duration to the magnetic transducer to produce a magnetic transition on the medium;
2. moving the medium across the gap defined by the head;
3. detecting the magnetic transition as it moves through a predetermined position relative to the gap by the same transducer;
4. measuring the time elapsed between the production and the subsequent detection of the magnetic transition; and
5. converting said time measurement into an indication of the speed of the medium.

10. A method according to claim 9 including the step of transmitting the detected signal to circuitry for applying pulses to the magnetic transducer for producing a subsequent magnetic transition on the magnetic medium.

11. A method according to claim 10 wherein the magnetic medium is a tape having a magnetic film imposed on one side thereof including the step of moving the tape in alignment with the length of the nonmagnetic gap.

12. A method according to claim 10 wherein the magnetic medium is a disc having a magnetic oxide film imposed on one side thereof including the step of rotating the disc relative to the nonmagnetic gap.

13. A method according to claim 10 wherein the converting step includes the step of transmitting the time measurement to a display apparatus for producing visible indications of the speed of the medium.

14. A method according to claim 10 including the step of limiting the pulses applied to the magnetic transducer to a duration which is small relative to the duration of time for the magnetic medium to move a distance corresponding to the length of the nonmagnetic gap.

15. A tape speed monitor comprising:
- a magnetic core having a first and second side and a recording gap defined by the two sides of the core;
- a magnetic recording tape located in recording relationship relative to the gap;
- a first winding inductively coupled to the first side of the core;
- a signal generator for writing a signal on the tape coupled to the first winding;
- a second winding inductively coupled to the second side of the core;
- a peak detector-amplifier coupled to the second winding for reading and amplifying a signal recorded on the tape;
- means connecting the output of the detector-amplifier to the input of the signal generator such that a signal written on the tape by the generator subsequently induces a signal in the second winding, the peak of said induced signal causing the detector-amplifier to apply a succeeding pulse to the input of the generator; and
- means for monitoring and translating the pulses from the detector-amplifier to the signal generator into an indication of the instantaneous speed of the magnetic tape.

16. Apparatus for indicating the speed of a magnetic medium comprising:
- a magnetic head having a core and read and write windings thereon, the core having a gap therein which is positionable adjacent the magnetic medium;
- means responsive to a pulse signal in said read winding for applying a pulse signal in said write winding causing a magnetic signal in said gap for recording on such magnetic medium.

17. Apparatus according to claim 16 comprising means for providing a signal indicative of the time duration between pulses read by said read winding.

18. Apparatus according to claim 16 wherein the duration of said pulse signal formed by said pulse applying means is substantially less than the time for a point on such medium to traverse said gap.

19. Apparatus according to claim 18 wherein said pulse responsive means comprises a first circuit for sensing and amplifying the signal in said read winding and producing a predetermined output signal and a second circuit responsive to the predetermined output signal for producing said pulse signal in said write winding.

20. The method of measuring the velocity of a moving recording medium using a magnetic transducer having a core with a gap therein positioned in reading and recording relationship with the medium comprising the steps of:

a. applying a change in magnetic signal to the core causing a magnetic transition to be recorded at the gap on the moving medium;

b. sensing a magnetic signal in the core which is caused by said magnetic transition during movement of the medium across said gap;

c. responding to said sensed magnetic signals for applying further changes in magnetic signals to the same core, the repetition rate of the sensed signals thereby providing an indication of the velocity of the moving medium.

* * * * *